US008883340B2

(12) United States Patent
Lee et al.

(10) Patent No.: US 8,883,340 B2
(45) Date of Patent: Nov. 11, 2014

(54) SECONDARY BATTERY

(75) Inventors: Chiyoung Lee, Yongin-si (KR);
Seokyoon Yoo, Yongin-si (KR); Yoontai Kwak, Yongin-si (KR); Dongwook Kim, Yongin-si (KR); Jongseok Moon, Yongin-si (KR); Tatsuya Hashimoto, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 168 days.

(21) Appl. No.: 12/929,120

(22) Filed: Jan. 3, 2011

(65) Prior Publication Data
US 2011/0300436 A1 Dec. 8, 2011

(30) Foreign Application Priority Data

Jun. 8, 2010 (KR) .................. 10-2010-0053744

(51) Int. Cl.
*H01M 2/26* (2006.01)
(52) U.S. Cl.
CPC ............... *H01M 2/263* (2013.01); *Y02E 60/12* (2013.01)
USPC ........................................ 429/161
(58) Field of Classification Search
CPC ................ H01M 2/26; H01M 2/263
USPC ......................... 429/161, 186, 211
See application file for complete search history.

(56) References Cited

U.S. PATENT DOCUMENTS

| 5,716,731 | A | * | 2/1998 | Goetzer et al. | ............... | 429/103 |
| 2002/0182493 | A1 | * | 12/2002 | Ovshinsky et al. | ........... | 429/176 |
| 2003/0215706 | A1 | * | 11/2003 | Alunans et al. | ............... | 429/161 |
| 2009/0087735 | A1 | * | 4/2009 | Yoon et al. | .................... | 429/185 |

FOREIGN PATENT DOCUMENTS

| JP | 2005-142026 | 2/2005 |
| KR | 10-2008-0095612 A | 10/2008 |
| KR | 10-0879297 B1 | 1/2009 |

OTHER PUBLICATIONS

Korean Office Action in KR 10-2010-0053744, dated May 25, 2012 (Lee, et al.).

* cited by examiner

*Primary Examiner* — Ula C Ruddock
*Assistant Examiner* — Scott J Chmielecki
(74) *Attorney, Agent, or Firm* — Lee & Morse, P.C.

(57) ABSTRACT

A secondary battery including a case having an internal space; an electrode assembly in the case, the electrode assembly including a positive electrode, a negative electrode, a separator between the positive electrode and the negative electrode, and a non-coating portion; a collector plate, the collector plate including a plate section and a protrusion extending from the plate section, the protrusion being inserted into and coupled to the non-coating portion; a collector terminal coupled to one end of the collector plate, the collector terminal protruding upwardly from the case; and a cap plate coupled to a top end of the case and sealing the case.

10 Claims, 4 Drawing Sheets

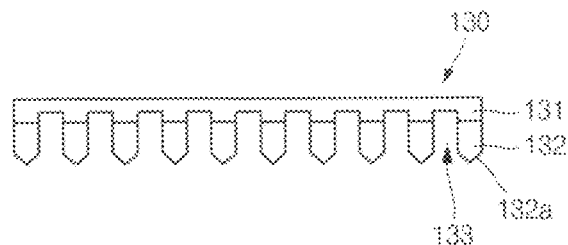
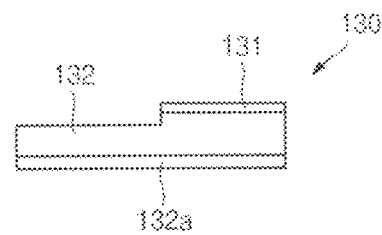
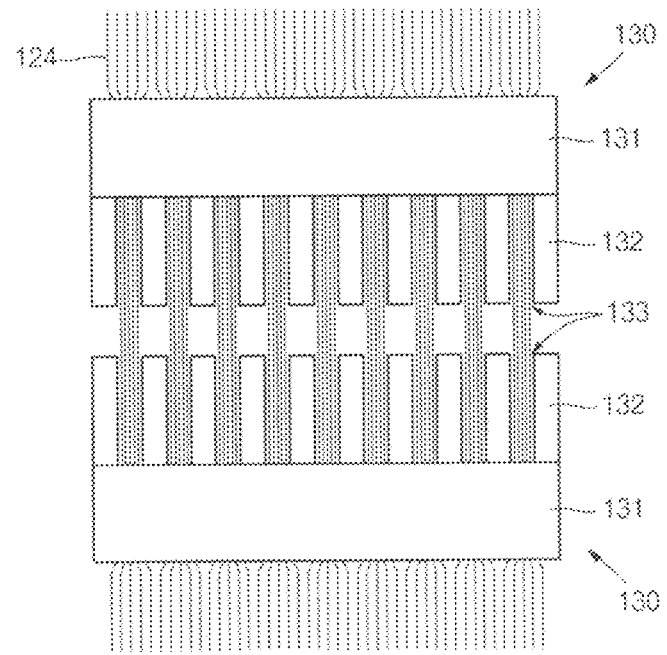

SECONDARY BATTERY

BACKGROUND

1. Field

Embodiments relate to a secondary battery.

2. Description of the Related Art

In general, unlike primary batteries, which are not chargeable, secondary batteries are chargeable and dischargeable. Small sized secondary batteries may be widely used in a variety of high-tech electronic devices, e.g., cellular phones, notebook computers, camcorders, and the like. Large sized secondary batteries may be used as the power source for a motor drive, e.g., in electric vehicles or hybrid electric vehicles. The secondary battery may generally be configured such that an electrode assembly is housed inside a case and electrode terminals are connected to collector plates welded to the electrode assembly.

SUMMARY

Embodiments are directed to a secondary battery, which represents advances over the related art.

It is a feature of an embodiment to provide a secondary battery having improved efficiency and reliability in welding a non-coating portion of an electrode assembly to a collector plate.

It is another feature of an embodiment to provide a secondary battery that facilitates easy detection of a welding state.

At least one of the above and other features and advantages may be realized by providing a secondary battery including a case having an internal space; an electrode assembly in the case, the electrode assembly including a positive electrode, a negative electrode, a separator between the positive electrode and the negative electrode, and a non-coating portion; a collector plate, the collector plate including a plate section and a protrusion extending from the plate section, the protrusion being inserted into and coupled to the non-coating portion; a collector terminal coupled to one end of the collector plate, the collector terminal protruding upwardly from the case; and a cap plate coupled to a top end of the case and sealing the case.

The protrusion of the collector plate may include a plurality of protrusions coupled to the non-coating portion, the plurality of protrusions may extend longer than a length of the plate section below the plate section, and the non-coating portion may be positioned between the protrusions.

A pair of the collector plates may be coupled to at least one of the positive electrode and the negative electrode of the non-coating portion, and the protrusions may be alternately coupled to each other and the non-coating portion is between the protrusions of the pair of collector plates.

The collector plate may be coupled to the non-coating portion such that the non-coating portion is coupled to one surface of each of the protrusions alternating each other and abutting the one surface.

The non-coating portion may be coplanar with the protrusions or extends further upward on the protrusions.

The non-coating portion may be bent along the protrusions of the collector plate.

The protrusions of the collector plate may extend in a direction in which the collector plate is coupled to the non-coating portion.

A width of the plate section may be smaller than a width of the non-coating portion.

Each of the protrusions may have an inclined surface having a thickness gradually decreasing in a direction away from the plate section of the collector plate.

A width of each of the protrusions may be smaller than a width of a gap between the protrusions.

The protrusions and the non-coating portion may be disposed within the gap.

The protrusions of the collector plate and the non-coating portion may be welded together in a connected state in which there is no gap between the protrusions of the collector plate and the non-coating portion.

BRIEF DESCRIPTION OF THE DRAWINGS

The above and other features and advantages will become more apparent to those of ordinary skill in the art by describing in detail exemplary embodiments with reference to the attached drawings, in which:

FIG. 4 illustrates a front view of a collector plate in the secondary battery shown in FIG. 1;

FIG. 5 illustrates is a side view of a collector plate in the secondary battery shown in FIG. 1; and FIGS. 6 through 8 illustrate stages in a method in which collector plates and a non-coating portion are coupled to each other in a secondary battery according to an embodiment.

DETAILED DESCRIPTION

Figure 1:
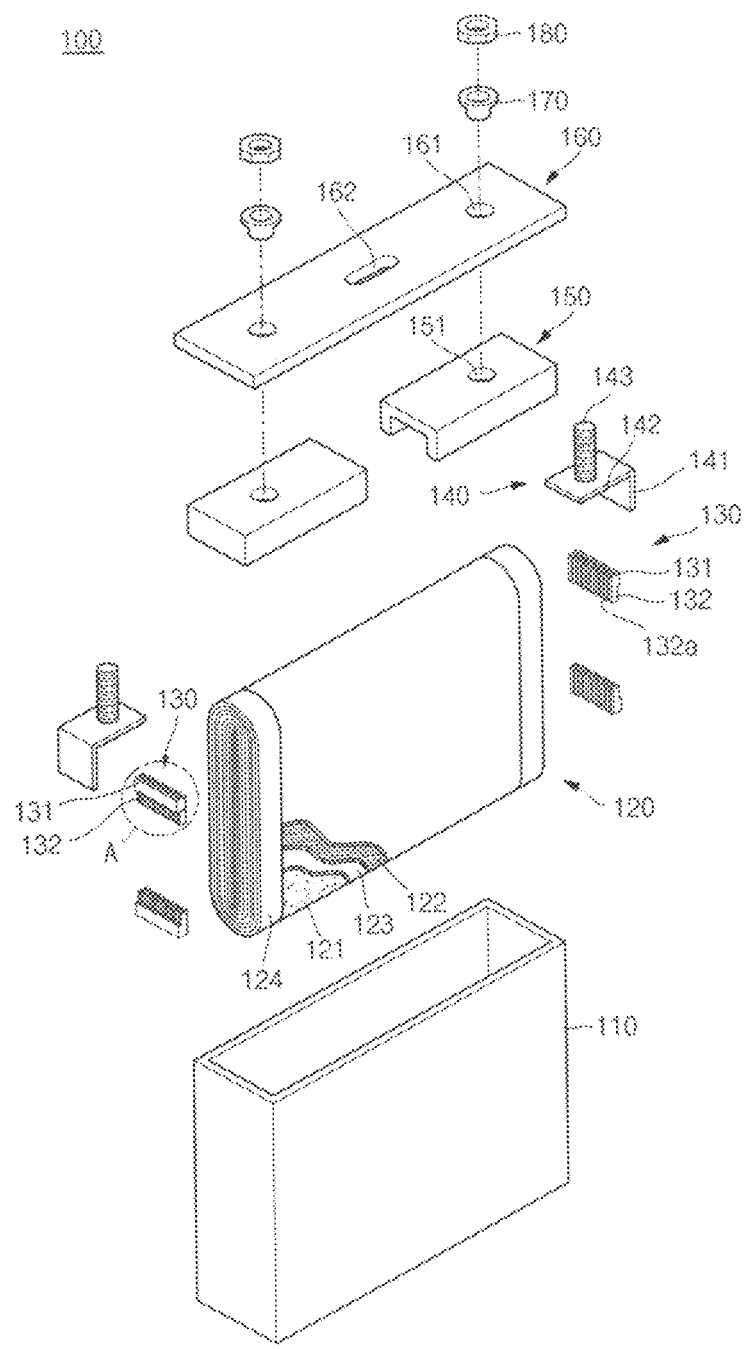
FIG. 1 illustrates an exploded perspective view of a secondary battery according to an embodiment.

Korean Patent Application No. 10-2010-0053744, filed on Jun. 8, 2010, in the Korean Intellectual Property Office, and entitled "Secondary Battery", is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two layers, it can be the only element between the two elements, or one or more intervening elements may also be present. Like reference numerals refer to like elements throughout.

A construction of a secondary battery according to an embodiment will now be described.

Figure 2:
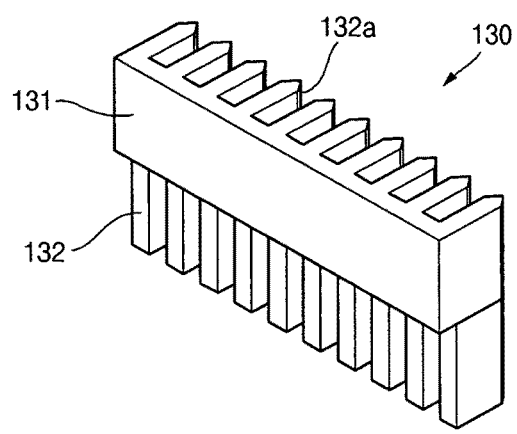
FIG. 2 illustrates an enlarged view of a portion 'A' of FIG. 1.
Figure 3:
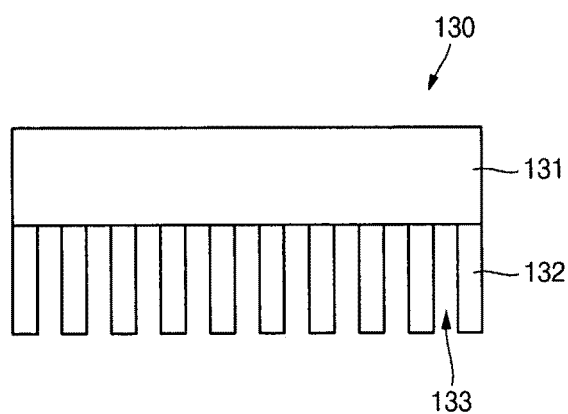
FIG. 3 illustrates a plan view of a collector plate in the secondary battery shown in FIG. 1.

FIG. 1 illustrates an exploded perspective view of a secondary battery according to an embodiment. FIG. 2 illustrates an enlarged view of a portion 'A' of FIG. 1. FIG. 3 illustrates a plan view of a collector plate in the secondary battery shown in FIG. 1. FIG. 4 illustrates a front view of the collector plate in the secondary battery shown in FIG. 1. FIG. 5 illustrates is a side view of the collector plate in the secondary battery shown in FIG. 1.

Referring to FIGS. 1 through 5, the secondary battery 100 according to an embodiment may include a case 110, an electrode assembly 120 in the case 110, a collector plate 130 electrically connected to the electrode assembly 120, a current collecting terminal 140 electrically connected to the collector plate 130, a first dielectric body 150 through which the current collecting terminal 140 penetrates, a cap plate 160 coupled to an upper side of the first dielectric body 150, and a second dielectric body 170 penetrating through the cap plate 160 to then be coupled to the current collecting terminal 140. A nut 180 may be coupled to the current collecting terminal 140.

The case 110 may have a hexahedron shape or other suitable shapes having an inner space to receive the electrode assembly 120. In addition, the case 110 may be made of conductive metal, e.g., a stick coated with aluminum, aluminum alloy, or nickel.

The electrode assembly 120 may be housed inside the case 110. The electrode assembly 120 may be constructed by stacking a positive electrode 121 and a negative electrode 122 with a separator 123 interposed therebetween. Then, the resulting structure may be wound into a jelly roll configuration. In providing the electrode assembly 120 inside the case 110, only a single electrode assembly is illustrated by way of example for brevity of explanation, but it should be understood that a plurality of electrode assemblies may be provided.

In addition, the electrode assembly 120 includes a non-coating portion 124 at both ends thereof. That is, the non-coating portion 124 may be formed as a pair, e.g., a portion formed at a first end of the electrode assembly 120 to be connected to the positive electrode plate 121 and a portion formed at a second end of the electrode assembly 120 to be connected to the negative electrode plate 122.

The collector plate 130 may include first and second collector plates enmeshed together with the non-coating portion therebetween. In order to be coupled to the collector plate 130 including the first and second collector plates enmeshed together with the non-coating portion therebetween, the paired non-coating portions 124 may be bent at least one time in a first direction in which the electrode assembly 120 is coupled to the case 110. The non-coating portion 124 may be between the first and second collector plates enmeshed together and may be welded in a state to be coplanar with the collector plate 130 or to extend further upward on the collector plate 130. The non-coating portion 124 may be welded to the collector plate 130 by, e.g., a butt weld. Thus, since welding may be performed in a state in which both the non-coating portion 124 and the collector plate 130 are exposed to the outside, welding efficiency may be improved and a welding state of the non-coating portion 124 may be easily externally checked, thereby ensuring welding reliability. In addition, since the butt weld may be used, the non-coating portion 124 to be welded may only be as long as a thickness of the collector plate 130. That is to say, a length of the non-coating portion 124 for welding may be reduced, thereby advantageously increasing a volume of active portions of the electrode assembly 120.

The collector plate 130 may be coupled to the non-coating portion 124 of the electrode assembly 120. The collector plate 130 may be coupled to at least one of the non-coating portion 124 on the positive electrode plate 121 and/or the negative electrode plate 122 by welding. In the following description, a coupling process of the collector plate 130 with the non-coating portion 124, specifically, with one of the non-coating portion 124 of the positive electrode plate 121, will be described by way of example.

The collector plate 130 may be coupled to the non-coating portion 124 of the positive electrode plate 121 as a pair.

The collector plate 130 may include a plate section 131 and a plurality of protrusions 132 extending from the plate section 131 in a first direction. The plurality of protrusions 132 may be coupled to the plate section 131. Neighboring protrusions 132 may be spaced apart from each other by a predetermined gap 133. As illustrated in FIG. 4, each of the protrusions 132 may have an inclined surface 132a such that a thickness thereof gradually decreases in a downward direction, i.e., away from the plate section 131. In other words, each of the protrusions 132 may come to a point due to the inclined surface 132a. Thus, when the protrusions 132 are meshed together from an upper side of the non-coating portion 124, the non-coating portion 124 may move along the inclined surface 132a of each protrusion 132 to then be placed in the gap 133. Here, a width of the gap 133 may be greater than a width of each protrusion 132. Thus, the protrusion 132 may be positioned within the gap 133; and the protrusion 132 may be welded to the non-coating portion 124 along edges between the protrusions 132.

The secondary battery 100 may include a pair of collector plates 130 enmeshed together such that the protrusions 132 alternate each other. The pair of collector plates 130 may mesh with each other at one end of the non-coating portion 124 such that the protrusions 132 alternate with each other. The non-coating portion 124 may be positioned in the gap between the collector plates enmeshed together. The non-coating portion 124 may be coplanar with the protrusions 132 or may extend further upward on the protrusions 132. In such a state, a butt weld may be performed on the non-coating portion 124 and the protrusions 132, thereby coupling the non-coating portion 124 and the protrusions 132 to each other.

The current collecting terminal 140 may include a pair of current collecting terminals to be electrically connected to the collector plate 130. Specifically, the current collecting terminal 140 may be connected to the plate section 131 of the collector plate 130, establishing a path through which charge/discharge voltages of the electrode assembly 120 may be input and output. The current collecting terminal 140 may include a first plate 141 coupled to the collector plate 130 in a first direction, a second plate 142 extending from the first plate 141 in a second direction perpendicular to the first direction, and an electrode terminal 143 upwardly protruding from the second plate 142 in the first direction. The electrode terminal 143 may upwardly protrude from the cap plate 160 to then be connected to, e.g., a charge/discharge circuit. In addition, a male thread may be provided on the outer circumference of the electrode terminal 143 to be engaged with the nut 180 in a subsequent process.

The first dielectric body 150 may be formed at an upper side of the current collecting terminal 140. The first dielectric body 150 may be disposed between the second plate 142 of the current collecting terminal 140 and the cap plate 160. The first dielectric body 150 may electrically isolate the current collecting terminal 140 from the cap plate 160. In addition, the first dielectric body 150 may include a terminal hole 151 formed therein, so that the electrode terminal 143 of the current collecting terminal 140 may extend through the terminal hole 151 to protrude upwardly.

The cap plate 160 may be disposed at the upper side of the case 110 to hermetically seal the case 110. The cap plate 160 may be coupled to the case 110 and may prevent leakage of an electrolyte contained within the case 110. The cap plate 160 may include a terminal hole 161 formed therein, so that the electrode terminal 143 may extend through the terminal hole 161 to protrude upwardly. In addition, the cap plate 160 may include a vent 162 at an approximately center thereof. If gas is generated inside the case 110 due to overcharge, the vent 162 may be opened before other parts of the secondary battery 100, thereby releasing the gas from the case 110.

The second dielectric body 170 may be disposed between the cap plate 160 and the electrode terminal 143 of the current collecting terminal 140. The second dielectric body 170 may electrically isolate the cap plate 160 from the electrode terminal 143 of the current collecting terminal 140. In addition, since the second dielectric body 170 may also be formed at the upper side of the cap plate 160, it may electrically isolate the cap plate 160 and the nut 180 from each other when the nut 180 is engaged with the electrode terminal 143.

The nut 180 may be disposed at an upper side of the second dielectric body 170. The nut 180 may have a female thread provided therein to correspond to and be coupled to the electrode terminal 143 of the current collecting terminal 140. The nut 180 may securely fix the electrode terminal 143 of the current collecting terminal 140, thereby fixing positions of the current collecting terminal 140 and the electrode assembly 120.

Hereinafter, a configuration in which a collector plate and a non-coating portion are coupled to each other in a secondary battery according to an embodiment of the present invention will now be described in more detail.

Figure 7:
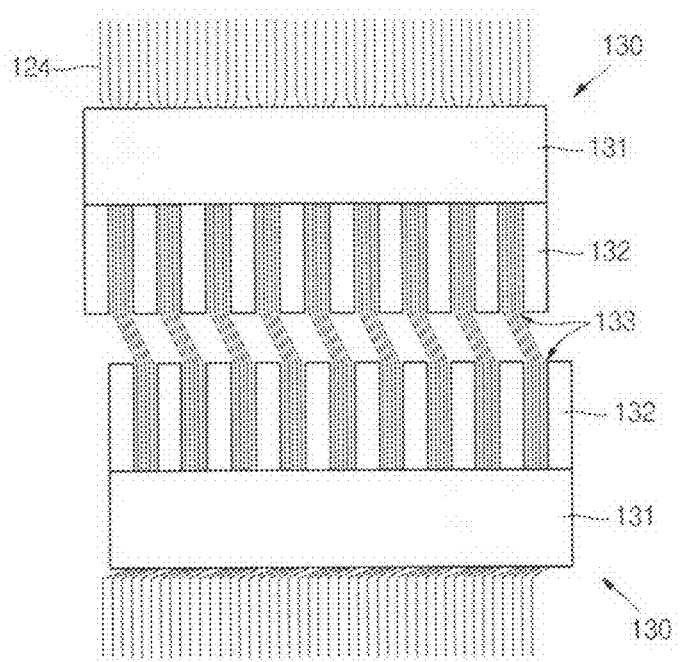
Figure 8:
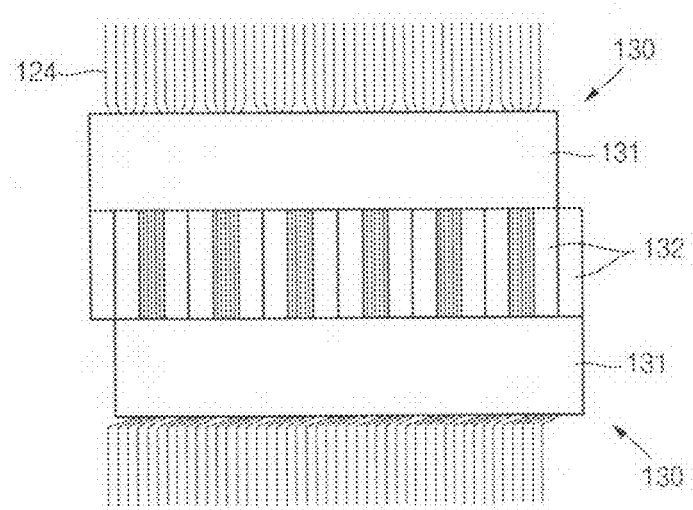

FIGS. 6 through 8 illustrate stages in a method in which collector plates and a non-coating portion are coupled to each other in a secondary battery according to an embodiment.

First, as illustrated in FIG. 6, in the secondary battery 100 according to an embodiment, a pair of collector plates 130 may be positioned on the non-coating portion 124 in a first direction. The pair of collector plates 130 including a first collector plate and a second collector plate may be disposed such that protrusions 132 of the first collector plate correspond to those of the second collector plate along the first direction of the non-coating portion 124. Here, at least one positive electrode plate of the non-coating portion 124 of the wound electrode assembly 120 may be positioned in a gap 133 between each of the protrusions 132 of the collector plates 130. Alternatively, the non-coating portion 124 may extend from the protrusions 132 in a second direction, that is to say, toward a side surface of the electrode assembly 120.

As illustrated in FIG. 7, at least one of the pair of collector plates 130 may be moved in a horizontal direction, so that the protrusions 132 of the collector plates 130 are alternately arranged in a zigzag shape or offset configuration. Accordingly, the non-coating portion 124 positioned within the gap 133 between the protrusions 132 may be bent at least one time.

As illustrated in FIG. 8, at least one of the pair of collector plates 130 may be moved in a vertical direction so that the protrusions 132 of the collector plates 130 are coupled to and butt against each other. The protrusions 132 may be coupled to each other to butt against a plate section 131 of the corresponding collector plate 130, i.e., may become enmeshed. In addition, the protrusions 132 may be positioned within the gap 133. The non-coating portion 124 may also be positioned within the gap 133. The non-coating portion 124 may be disposed on only one side surface of each of the protrusions 132. That is to say, since the non-coating portion 124 may be between the alternately coupled protrusions 132, it may be positioned in a region within the gap 133, i.e., a region partitioned by the protrusions 132. Accordingly, the non-coating portion 124 may be repeatedly positioned on only one surface of each of the protrusions 132.

Here, the non-coating portion 124 may be coplanar with the protrusions 132 or may extend further upward on the protrusions 132. In such a state, a butt weld may be performed on the non-coating portion 124 and the protrusions 132, thereby coupling the non-coating portion 124 and the protrusions 132 to each other. In addition, although not illustrated in the drawing, a current collecting terminal may be coupled to any one of the collector plates 130 by, e.g., welding.

As described above, in the secondary battery 100 according to an embodiment, the collector plate 130 may be welded to the non-coating portion 124 of the electrode assembly 120 using a butt weld in a state in which the non-coating portion 124 is positioned between protrusions 132 of the collector plate 130, thereby increasing welding efficiency. In addition, a position of the non-coating portion 124 may be easily inspected from outside, thereby increasing welding reliability. Further, since the non-coating portion 124 for welding may only be as long as the thickness of the collector plate 130, a length of the non-coating portion 124 for welding may be reduced, thereby increasing an effective volume of the electrode assembly 120.

In addition, since positions of the non-coating portions are externally viewable by a naked eye, welding reliability can be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   a case having an internal space;
   an electrode assembly in the case, the electrode assembly including a positive electrode, a negative electrode, a separator between the positive electrode and the negative electrode, and a non-coating portion;
   a pair of collector plates, each collector plate including a plate section having a surface that faces the electrode assembly and protrusions that extend substantially perpendicularly from the surface of the plate section, the protrusions being inserted into and coupled to the non-coating portion;
   a collector terminal coupled to one end of the pair of collector plates, the collector terminal protruding upwardly from the case; and
   a cap plate coupled to a top end of the case and sealing the case, wherein:
   the pair of collector plates is coupled to the non-coating portion of at least one of the positive electrode and the negative electrode,
   the protrusions of one of the collector plates are alternately coupled between the protrusions of another of the collector plates and the non-coating portion by butt welding,
   at least one of the protrusions of one of the pair of collector plates butts against the plate section of the other of the pair of collector plates, and
   the non-coating portion is disposed on only one side surface of each of the protrusions to which the non-coating portion is coupled.

2. The secondary battery as claimed in claim 1, wherein:
the protrusions have a first length in a first direction, the plate section has a second length in the first direction, and the first length is greater than the second length,
the protrusions extend beyond the surface of the plate section, and
the non-coating portion is positioned between the protrusions.

3. The secondary battery as claimed in claim 1, wherein the non-coating portion is coplanar with the protrusions or extends further upward on the protrusions.

4. The secondary battery as claimed in claim 1, wherein the non-coating portion is bent along the protrusions of each collector plate.

5. The secondary battery as claimed in claim 1, wherein the protrusions of each collector plate extend in a direction in which the collector plate is coupled to the non-coating portion.

6. The secondary battery as claimed in claim 1, wherein a width of the plate section is smaller than a width of the non-coating portion.

7. The secondary battery as claimed in claim 1, wherein each of the protrusions has an inclined surface having a thickness gradually decreasing in a direction away from the plate section of each collector plate.

8. The secondary battery as claimed in claim 1, wherein a width of each of the protrusions is smaller than a width of a gap between the protrusions of each collector plate.

9. The secondary battery as claimed in claim 8, wherein the protrusions of each collector plate and the non-coating portion are welded together in a connected state in which there is no gap between the protrusions of the collector plates and the non-coating portion.

10. The secondary battery as claimed in claim 2, wherein each protrusion includes a portion overlapping the plate section in the first direction.

* * * * *